United States Patent [19]
Berry et al.

[11] Patent Number: 5,872,913
[45] Date of Patent: Feb. 16, 1999

[54] SYSTEM AND METHOD FOR LOW OVERHEAD, HIGH PRECISION PERFORMANCE MEASUREMENTS USING STATE TRANSISTIONS

[75] Inventors: Robert F. Berry, Austin, Tex.; Maurice P. Franklin, Woodinville, Wash.; Weiming Gu; William Henry Hartner, both of Austin, Tex.

[73] Assignee: International Business Machines Corporation, Armonk, N.Y.

[21] Appl. No.: 813,885

[22] Filed: Mar. 7, 1997

[51] Int. Cl.⁶ ..................................... G06F 11/22
[52] U.S. Cl. .................. 395/184.01; 395/183.08; 395/183.07
[58] Field of Search ............ 395/184.01, 183.08, 395/183.07

[56] References Cited

U.S. PATENT DOCUMENTS

| | | | |
|---|---|---|---|
| 3,818,458 | 6/1974 | Deese | 395/184.01 |
| 4,849,879 | 7/1989 | Chinnaswamy et al. | 706/45 |
| 5,038,307 | 8/1991 | Krishnakumar et al. | 364/578 |
| 5,291,605 | 3/1994 | Takagi et al. | 395/868 |
| 5,293,603 | 3/1994 | MacWilliams et al. | 395/309 |
| 5,410,710 | 4/1995 | Sarangdhar et al. | 395/739 |
| 5,432,932 | 7/1995 | Chen et al. | 395/673 |
| 5,450,349 | 9/1995 | Brown, III et al. | 395/183.03 |
| 5,511,204 | 4/1996 | Crump et al. | 395/750.07 |
| 5,511,205 | 4/1996 | Kannan et al. | 395/750.06 |
| 5,696,701 | 12/1997 | Bergess et al. | 395/183.01 |
| 5,732,273 | 3/1998 | Srivastava et al. | 395/704 |

OTHER PUBLICATIONS

"Power–Managing the PowerPC 601* CPU," *IBM Technical Disclosure Bulletin*, vol. 39, No. 1, Jan. 1996, pp. 217–220.

*Primary Examiner*—Ly Hua
*Attorney, Agent, or Firm*—Leslie A. Van Leeuwen; Jeffrey S. LaBaw

[57] ABSTRACT

The present invention is directed to a system and method of measuring performance data utilizing state transitions within a computer system. A number of system states are defined, and the transitions from one state to another are tracked. At each state transition, performance properties related to the computer system may be checked or calculated, and performance data added to a table or tables. The present invention allows performance data to be measured in a way that is highly precise and has minimal effects on the system performance being measured. The act of measuring performance data utilizing state transitions does not create a misleading measure of performance nor does it adversely impact system performance. Furthermore, the present invention requires minimal changes to the operating system and no changes to application code.

3 Claims, 4 Drawing Sheets

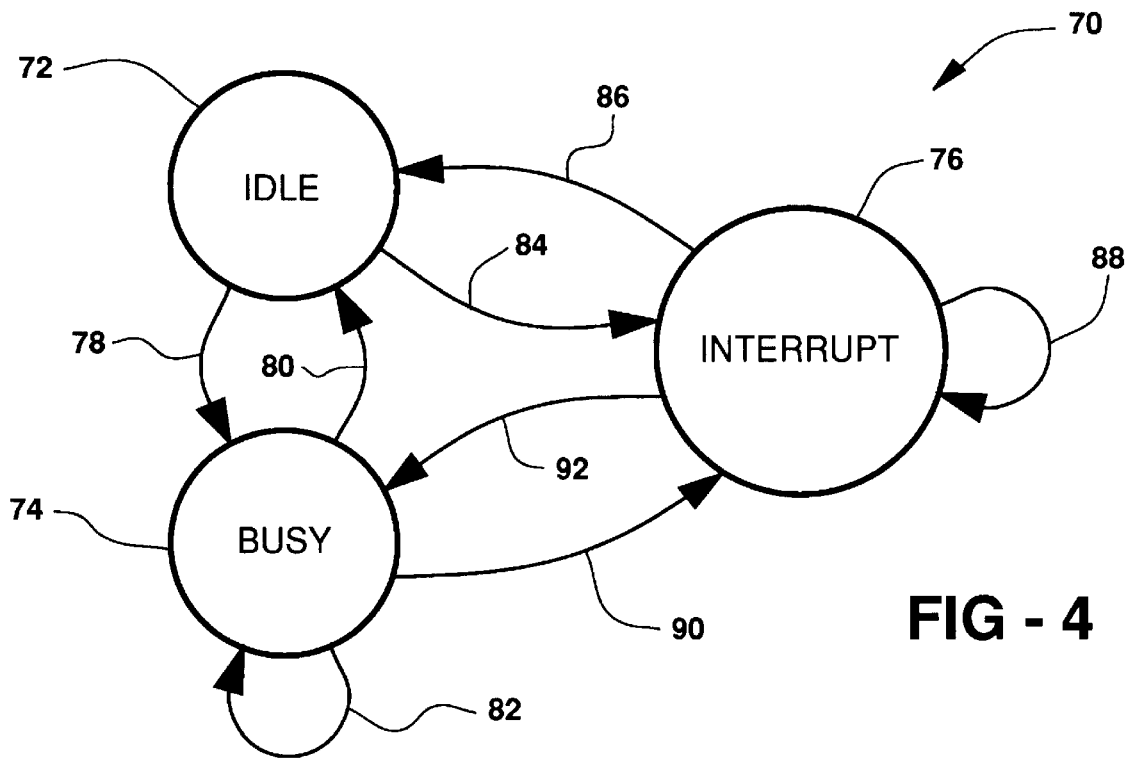
FIG - 4
FIG - 5
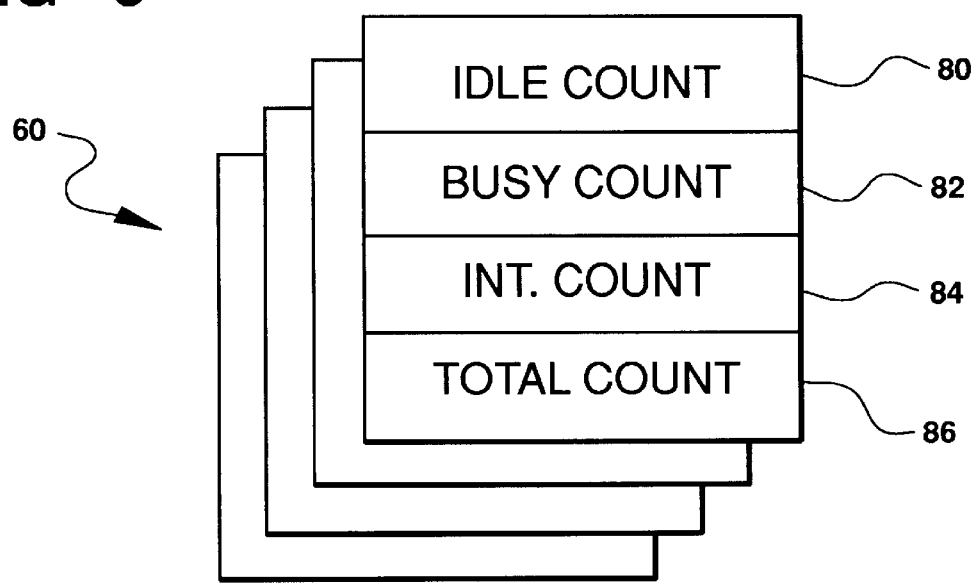

SYSTEM AND METHOD FOR LOW OVERHEAD, HIGH PRECISION PERFORMANCE MEASUREMENTS USING STATE TRANSISTIONS

BACKGROUND OF THE INVENTION

1. Field of the Invention

The present invention relates to information processing systems and, more particularly, to a system and method for efficiently and accurately measuring and monitoring system performance.

2. Description of Related Art

At any given time in a computer system, each central processing unit, or processor, is in one of a number of mutually exclusive states (or is in the process of transitioning from one mutually exclusive state to another). The state of a processor is defined in terms of the nature of the work being performed by the processor. One simple view of processor behavior defines three states: idle, busy, and interrupt.

An operating system controls the allocation of all resources in a symmetrical multi-processor (SMP) system, including the processors. In a thread-based operating system, a component within the operating system, referred to as a scheduler, schedules threads for execution in the processors, while a dispatcher, or dispatching unit, actually dispatches the threads to the processors. A thread is the smallest unit of dispatchable work in a system, and usually consists of one or more lines of code. The code may be kernel code, operating system code, application program code, or any other type of code running in the system. A processor executing a thread from any of these types of code is said to be executing a "user" thread, and the processor is considered to be in a busy state.

If an interrupt occurs, a component of the operating system, referred to as an interrupt handler, assigns a processor to handle the interrupt. The processor executes an interrupt service routine and then returns to the thread that it was executing when the interrupt occurred. If no interrupts are being handled, and no user threads are being executed, a processor is defined to be in an idle state. Typically, there is a specific piece of code, referred to as an idle loop or idle thread, which a processor continuously executes while in an idle state.

For performance reasons, it is often desirable to know how each processor is being utilized. Knowing the percentage of time a processor spends in each state may enable a programmer to enhance overall system performance. For example, while a particular application is running in an SMP environment, one processor may be busy 90% of the time, while another processor is only busy 10% of the time. It may be possible to rewrite the application code to off-load work from the busier processor onto a less busy processor and thus improve overall system performance.

One prior art method for measuring system idle time versus busy time involves the use of a low-priority thread. This thread is assigned a low enough priority so that it only runs when no other threads are running. The amount of time a processor spends executing the low-priority thread is calculated, and is assumed to be equal to system idle time in a system which does not contain the low-priority thread.

However, this prior art method of measuring processor utilization requires the use of a relatively extensive amount of system resources. There is system overhead involved every time a thread is ended and a new thread begins execution. Every time "real work" needs to be done, the low-priority thread must be ended and the new thread must be dispatched. Many operating systems are not very efficient at swapping threads. Thus, the very act of measuring system performance by using a low-priority thread can significantly degrade system performance. This results in an inaccurate view of the resources actually consumed by a given program.

Another prior art method for measuring processor utilization is based on sampling. A thread interrupts the system on a regular basis and interrogates the state of each processor in the system. This can be done, for example, by examining processor queues or thread state variables.

However, there are numerous problems associated with this prior art method as well. This type of sampling tends to miss "small" state changes. Any time spent in a state below a certain threshold will be missed completely. Small state changes can be observed by increasing the sampling rate, but increasing the sampling rate detrimentally affects the very system performance being measured. This prior art approach is also subject to bias. Depending on the mechanism used to interrupt the system, this bias can severely impact the utility of the measures taken. For example, if the mechanism used to interrupt the system is a low priority interrupt, then system states that occur while higher priority interrupts are being serviced will never be observed. The sampling interrupt is deferred until the higher priority interrupt is completed, thus biasing the measure.

Consequently, it would be desirable to have a system and method for efficiently and accurately measuring performance data, including processor utilization, in an information system. It would be desirable to measure performance data in a manner which does not create a misleading measure of system performance, and where the act of measuring performance data does not adversely impact system performance. In addition, it would be desirable to have a system and method to measure system performance which requires minimal changes to the operating system and no changes to any application code.

SUMMARY OF THE INVENTION

Accordingly, the present invention is directed to a system and method of measuring performance data utilizing state transitions within a computer system. A number of system states are defined, and the transitions from one state to another are tracked. At each state transition, performance properties related to the computer system may be checked or calculated, and performance data added to a table or tables.

An advantage of the present invention is that it allows performance data to be measured in a way that is highly precise and has minimal effects on the system performance being measured. The act of measuring performance data utilizing state transitions does not create a misleading measure of performance nor does it adversely impact system performance. Another advantage of the present invention is that it requires minimal changes to the operating system and no changes to application code. The system states are part of the operating system's definition, and the system state changes occur during normal processing. Thus, the state change points already exist in the operating system's code, and instrumentation code is placed at the existing system state change points.

Other advantages of the invention and a more complete understanding of the invention may be had by referring to the following description taken in conjunction with the accompanying drawings.

BRIEF DESCRIPTION OF THE DRAWINGS

FIG. 4 is a processor state diagram according to the present invention.

FIG. 5 is a diagram of a table containing performance counters according to the present invention.

DETAILED DESCRIPTION OF A PREFERRED EMBODIMENT OF THE INVENTION

Figure 1:
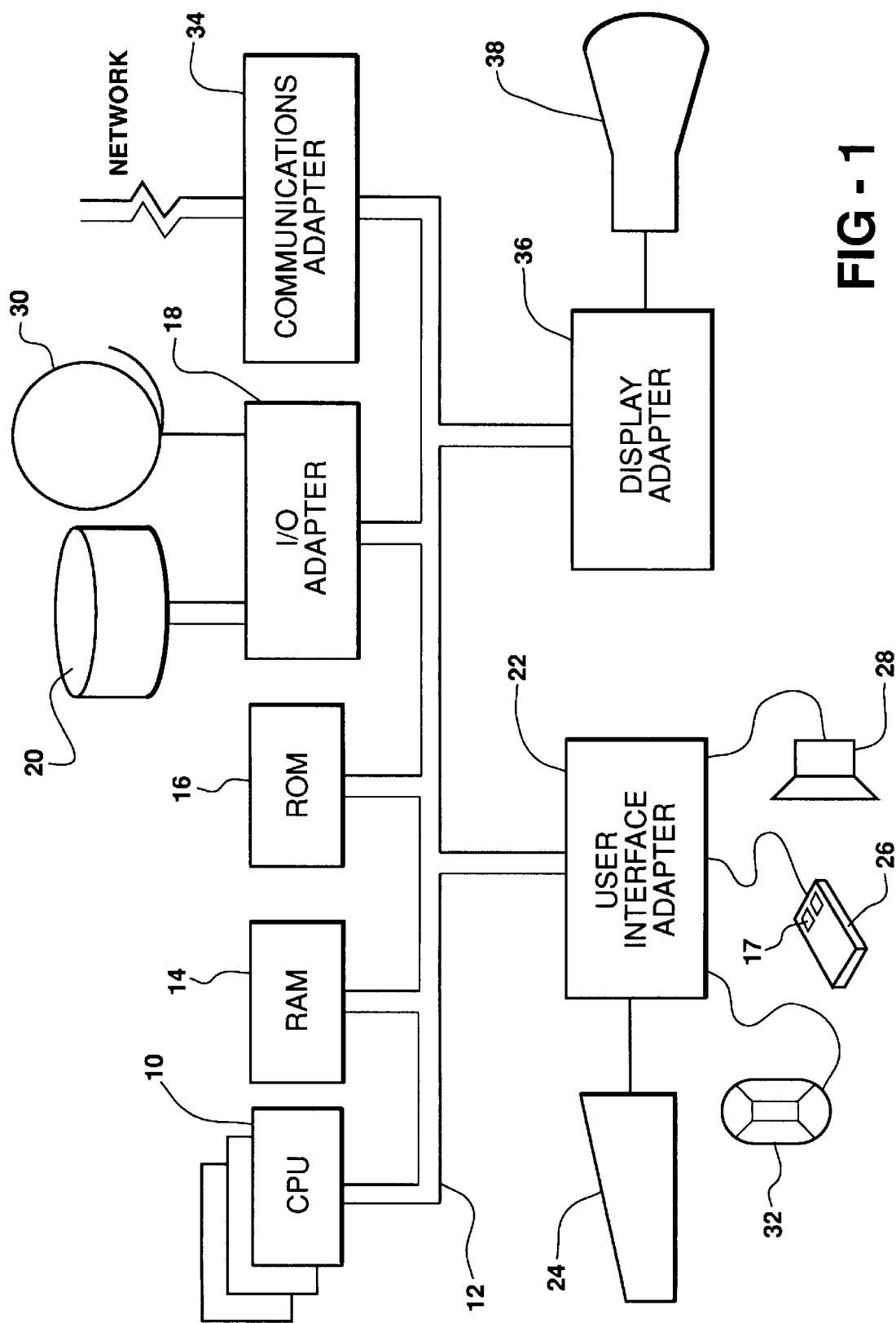
FIG. 1 is a block diagram of an information processing system capable of executing the performance monitoring tool of the present invention.

FIG. 1 illustrates a typical configuration of a computer information handling system in accordance with the subject invention, having at least one central processing unit, or processor 10. Processor 10 is interconnected via system bus 12 to random access memory (RAM) 14, read only memory (ROM) 16, and input/output (I/O) adapter 18 for connecting peripheral devices such as disk units 20 and tape drives 30 to bus 12, user interface adapter 22 for connecting keyboard 24, mouse 26 having button 17, speaker 28, microphone 32, and/or other user interface devices such as a touch screen device (not shown) to bus 12, communication adapter 34 for connecting the information handling system to a data processing network, and display adapter 36 for connecting bus 12 to display device 38.

Figure 2:
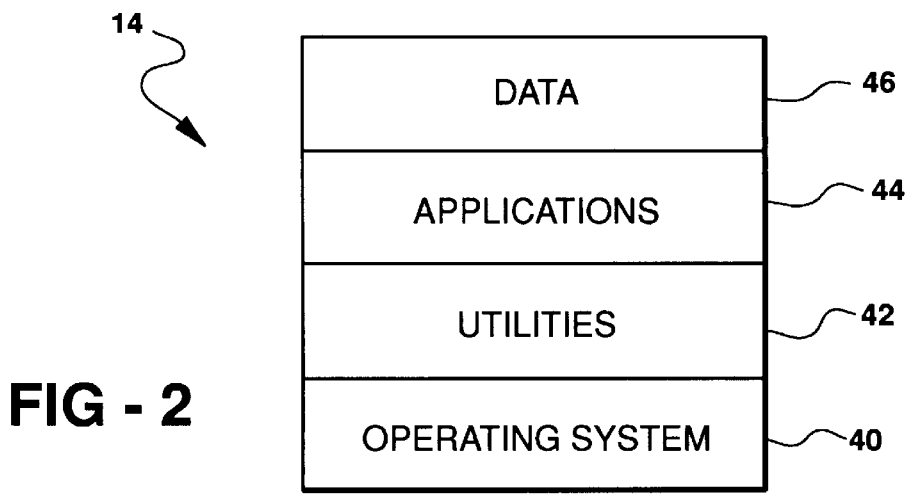
FIG. 2 is a diagram of the random access memory area of FIG. 1.

As shown in FIG. 2, programs and data are stored in RAM 14. An operating system 40 is used to control program execution within the system. A typical operating system which may be used in the present invention is IBM OS/2 (OS/2 is a trademark of International Business Machines Corporation). Note that other operating systems, including but not limited to Windows (Windows is a trademark of Microsoft Corporation), DOS, or AIX (AIX is a trademark of International Business Machines Corporation) may be used. Utility programs 42, application programs 44, and data 46 are also stored in RAM 14.

Figure 3:
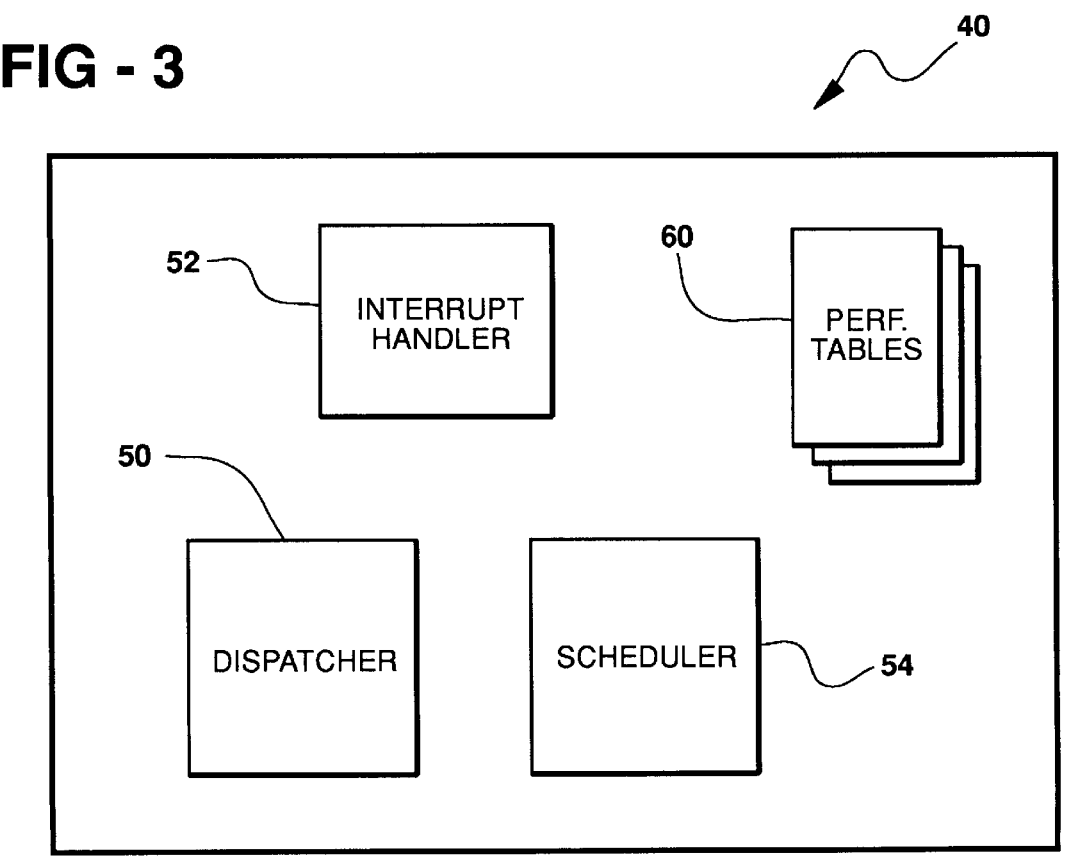
FIG. 3 is a diagram of several key components of an operating system according to the present invention.

Referring now to FIG. 3, a diagram of a typical operating system 40 is depicted. Note that FIG. 3 does not depict every element of operating system 40, but does show the elements of interest to the present invention. In the described embodiment of the present invention, operating system 40 includes a dispatching unit, or dispatcher 50, an interrupt handler 52, and a scheduler 54. Scheduler 54 is a piece of code which runs on a periodic basis, e.g., whenever a certain timer interrupt occurs. Scheduler 54 sorts the queue of available work, ensuring that the next thread to be executed by a processor is taken from the set of threads that are ready to run, i.e. not blocked, and have the highest priority. Dispatcher 50 takes the next thread to be executed from the queue and sets it up to run by saving the state of the thread that was running, setting up the state of the newly dispatched thread, and transferring control to the new thread. Interrupt handler 52 receives all system interrupts, and assigns a processor to handle each interrupt received. Note that the present invention may also be used in a single processor system.

Operating system 40 also contains a set of tables 60 for storing performance data. For the SMP embodiment, there is one table 60 for each processor in the system. Preferably, the memory area that contains these tables 60 is pinned, or resident, memory (i.e. it is never swapped out). In addition, separate memory areas for each processor are preferred. Separate memory areas eliminate the need for a locking system, or serialization of memory, and no processor has to wait to write its performance data to a shared memory area, thus eliminating inaccuracies due to additional wait time (which would not be present during normal processing) being added to a processor's performance data. Further details regarding the structure of tables 60 are discussed below with reference to FIG. 5.

The present invention uses the concept of a state machine 70, as depicted in FIG. 4, and associated counters, to record the changes between states. States are tracked on a per processor basis. In the current embodiment, three states are defined: idle 72, busy 74, and interrupt 76. A processor in idle state 72 is not executing a user thread, nor is it handling an interrupt. Rather, it is waiting for dispatcher 50 to dispatch a thread to it for execution. A processor typically starts out in idle state 72, and while in idle state 72 is usually looping through code referred to as idle code.

When a thread is dispatched to a processor, the processor then transitions to busy state 74. While in busy state 74, a processor is executing a user thread. If an interrupt occurs, either while in idle state 72 or busy state 74, the processor assigned to handle the interrupt transitions to interrupt state 76. A processor in interrupt state 76 is executing an interrupt handler or interrupt service routine.

While the described embodiment uses three states per processor, the invention may be practiced by selecting any number of states. For example, a separate busy state 74 may be defined for each thread in the system. Interrupt state 76 may also be broken down into separate states for each interrupt level, or separate states for each interrupt that can occur in the system. The choice of three states shown in FIGS. 4 and 5 is for illustration purposes only.

The present invention is concerned with the transitions that occur as a processor moves from one state to another. In the described embodiment, eight transitions are tracked, although the invention may be practiced by tracking any number of transitions. The transitions of interest in the described embodiment are as follows:

Transition 78:

The transition from idle 72 to busy 74, wherein dispatcher 50 enables, or dispatches, a thread for execution on a processor, and the processor begins to execute the thread.

Transition 80:

The transition from busy 74 to idle 72, wherein the processor completes execution of a thread and returns to idle state 72.

Transition 82:

The transition from busy 74 to busy 74, wherein the processor suspends execution of the currently executing thread to execute a higher-priority thread. Transition 82 also occurs when the higher-priority thread completes and the processor then continues to execute the lower-priority thread.

Transition 84:

The transition from idle 72 to interrupt 76, wherein interrupt handler 52 assigns an idle processor to handle an interrupt, and the processor begins to execute interrupt code.

Transition 86:

The transition from interrupt 76 to idle 72, wherein the processor finishes executing interrupt code and returns to idle state 72.

Transition 88:

The transition from interrupt 76 to interrupt 76, wherein a processor currently executing interrupt code is interrupted by a higher-level interrupt, and begins servicing that higher level interrupt. Transition 88 also occurs when the higher-level interrupt has been serviced and the processor returns to servicing the lower-level interrupt.

Transition 90:

The transition from busy 74 to interrupt 76, wherein interrupt handler 52 assigns a busy processor to handle an interrupt, and the processor begins to execute interrupt code.

Transition 92:

The transition from interrupt 76 to busy 74, wherein a processor finishes executing interrupt code and returns to executing a thread in busy state 74.

At each state transition, performance data may be checked or calculated, and data added into a table 60. Any type of hardware or software property may be checked at a state transition. One useful hardware property to calculate is a cycle count. Most modern processors have the capability to count cycles. Cycles are usually counted in a cycle counter. For example, on the Intel Pentium and Pentium Pro (Pentium and Pentium Pro are trademarks of Intel Corporation), a cycle counter is present on the processor chip itself. The cycle counter is a 64-bit counter that runs at the speed of the processor. For example, in a 100 MHz processor, the cycle counter counts 100 million cycles, also referred to as ticks, per second. To use as few resources as possible, and to be as granular as possible, it is preferred that the cycle counter used be a hardware clock provided by the processor chip. However, this is not a requirement to practice the present invention, and an off-chip counter may be used. Many modern processors also have the ability to count other items, such as cache misses, floating point operations, bus utilization, and translation look-aside buffer (TLB) misses. This data may also be checked at each transition, and data added to performance tables. Many modern processors allow this type of data to be accessed in a single instruction, making it a very fast, and minimally-intrusive measurement.

In the preferred embodiment, a cycle counter is checked at every transition point. The cycle counter checked may be a single cycle counter for all processors, either an off-chip counter or a cycle counter present on the master processor. Alternately, each processor may check its own cycle counter when the processor itself is making a transition from one state to another. The number of ticks that have occurred since the last transition are calculated, and added to the appropriate counter. The counters are shown in FIG. 5. As discussed above, there is a separate table 60 for each processor in the system. For each processor, an idle count 80, busy count 82, interrupt count 84, and total count 86 is maintained. These counts are the number of ticks, or cycles, a processor spent in the idle state 72, busy state 74, and interrupt state 76. A total count 86 is kept as a check.

In the described embodiment, transition 82, busy to busy, and transition 88, interrupt to interrupt are tracked. However, all busy time is kept in one busy count 82, and all interrupt time is kept in one interrupt count 84. If a separate busy count was kept for each thread, then each busy count would have its own entry in table 60. Similarly, if each interrupt level or individual interrupt was counted separately, each would have its own entry in table 60. Additional information, such as process ID and thread ID may also be kept in table 60. Alternately, performance data could be stored in existing tables that store other process ID and thread ID information.

The counts shown in FIG. 5 are useful to a programmer hoping to improve system performance. These counts may be used to determine the percentage of time each processor in the system is idle, busy, and processing interrupts. For example, suppose that for a certain period of time, a 100 MHz processor has a total busy count 82 of 7 million ticks, a total idle count of 2 million ticks, and a total interrupt count of 1 million ticks. This processor is busy 70% of the time, idle 20% of the time, and processing interrupts 10% of the time. Suppose another 100 MHz processor in the same system has a total busy count of 2 million ticks, and a total idle count of 8 million ticks. This processor is busy 20% of the time and idle 80% of the time. A programmer hoping to improve system performance may investigate ways in which to off-load some of the work from the first processor to the second processor.

If additional states are defined and counted separately, further performance tuning is possible. For example, if each interrupt is counted separately, then it is possible to discover which interrupt code is being executed most often in the system, and a programmer hoping to improve overall system performance could focus effort on improving the performance of the most frequently executed interrupt code. The same type of performance tuning could be accomplished at the process or thread level if process ID and thread ID information is stored as described above.

It is also possible to determine the actual time a processor spends in each state by dividing the number of ticks for each state by the speed of the processor. For example, suppose that for a certain period of time, a 100 MHz processor has a total busy count 82 of 2 million ticks. The total time spent in the busy state for this processor would be 2,000,000/100,000,000 for a total of 1/50 second.

To obtain the count data stored in table 60, a user or user application program performs a system call which moves the data from the operating system portion of RAM 14 to a user-readable memory area. The count data may then be displayed on a display screen, printed on a printer, or accessed by a user in a variety of ways. The count data may be obtained at regular intervals to provide an interval report of processor utilization. For example, a system call made every five seconds is infrequent enough so as to have little effect on system performance. A system call every five seconds could provide the following type of data on a per processor basis:

| time | busy | interrupt | idle |
| --- | --- | --- | --- |
| 10:01:00 | 58% | 5% | 3.7% |
| 10:01:05 | 40% | 6% | 54% |
| 10:02:10 | 50% | 5% | 45% |

The count data may also be used for remote diagnostics by a system administrator. The system administrator may query the count data at regular intervals or use an application program to query the count data at regular intervals as described above. The administrator is able to determine whether the remote machine is undergoing state changes indicating that an application is hung or that the machine is entirely idle, i.e. no state changes or few state changes. The exact method used to access and analyze the count data is not part of the present invention.

Figure 6:
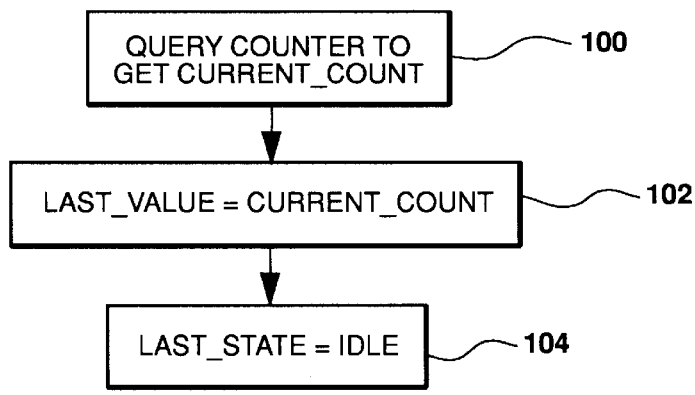
FIGS. 6 and 7 are flow charts depicting the method of the present invention.
Figure 7:
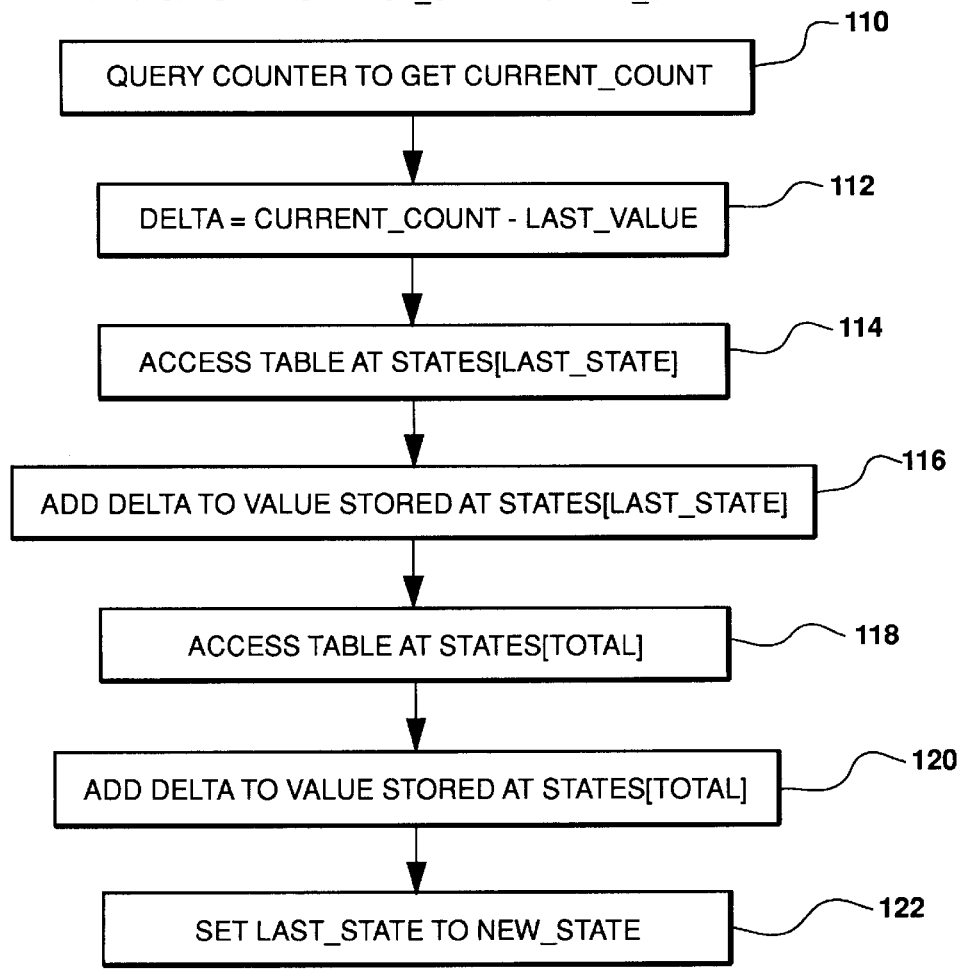

Referring now to FIGS. 6 and 7, flow charts depicting the method of the present invention are shown. In the described embodiment of the invention, the steps depicted in FIGS. 6 and 7 are executed by the operating system resident on the master processor. However, these steps could be performed by an operating system image on any processor within a system. FIG. 6 illustrates the method used to initialize system performance monitoring according to the present invention. The cycle counter is queried to obtain a starting count number, referred to as Current_Count (step 100). The Last_Value is set equal to Current_Count (step 102) and the Last_State is set equal to Idle (step 104).

FIG. 7 shows the steps performed when a state transition occurs. The cycle counter is queried to obtain the Current_Count (step 110). The difference between the current counter value, Current_Count, and the value at the last transition, Last_Count, is calculated and stored in a variable referred to as Delta (step 112). Table 60 is then accessed using Last_State as an index into table 60. For example, if Last_State is Idle, table 60 is accessed at idle count 80. The delta value is then added to the value accessed in table 60. Table 60 is also accessed at total count 86 (step 118), and the delta value is added to total count 86 (step 120). Finally, Last_State is set to the new state to which the processor is transitioning (step 122).

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 14 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for monitoring system performance in an information handling system, comprising the steps of:

selecting one or more properties to be monitored;

selecting a set of system states to be monitored from a plurality of existing system states; and at each transition from one of the selected system states to another of the selected system states, storing performance data obtained from each of the properties to be monitored in a storage means, wherein said storing step includes the steps of:

a last value, wherein the last value is a value previously read from a cycle counter;

reading the cycle counter to obtain a current count;

calculating a delta between the last value and the current count;

accessing a performance table at a location, using a first state as an index into the performance table;

adding the delta to a count value at the location accessed in the performance table;

setting the first state equal to a second state; and setting the last value equal to the current count.

2. A method for monitoring system performance according to claim 1, further comprising the steps of:

accessing the performance table at a total count location; and adding the delta to a total count value at the total count location accessed in the performance table.

3. A method for monitoring system performance according to claim 1, further comprising the step of initializing the performance monitoring, wherein said initializing step comprises the steps of:

querying the cycle counter to obtain the current count;

setting the last value equal to the current count; and setting the first state equal to the idle state.

* * * * *

UNITED STATES PATENT AND TRADEMARK OFFICE
CERTIFICATE OF CORRECTION

PATENT NO. : 5,872,913
DATED : February 16, 1999
INVENTOR(S) : Berry et al

It is certified that error appears in the above-identified patent and that said Letters Patent is hereby corrected as shown below:

Column 8, line 14, before the first "a" please add --obtaining--.

Signed and Sealed this

Sixth Day of July, 1999

Q. TODD DICKINSON

*Attest:*

*Attesting Officer*     Acting Commissioner of Patents and Trademarks